Patented Dec. 8, 1942

2,304,110

UNITED STATES PATENT OFFICE 2,304,110

PRODUCTION OF TITANIUM OXIDE PIGMENTS

Robert M. McKinney, Roselle, and Henry M. Stark, Arden, Del., assignors to E. I. du Pont de Nemours & Company, Wilmington, Del., a corporation of Delaware No Drawing. Application November 29, 1938, Serial No. 242,923

13 Claims. (Cl. 23—202)

This invention relates to the production of titanium oxide pigments, and particularly to the production of pigment titanium oxide in substantially rutile crystalline state. More specifically, it relates to a process for producing rutile titanium oxide pigments from mineral acid solutions of titanium adapted, normally, to produce anatase titanium oxide.

Titanium oxide occurs in three crystalline states, i. e., anatase, brookite, and rutile, the respective refractive indices of which are 2.52, 2.64 and 2.71. Although rutile exhibits the highest refractive index and therefore the greatest potential hiding power value, commercial titanium oxide pigments are characteristically anatase in crystalline structure. Likewise, though rutile production processes are available and known, they have not been exploited commercially, principally because resort to relatively pure titanium chloride solutions is required, these being obtained from processes requiring chlorination of titaniferous ores at exceedingly high temperatures. Many difficulties are encountered in such processes, particularly those involving corrosion problems, and, as a consequence, such processes are extremely uneconomical and commercially unattractive for the production of rutile titanium oxide pigments on a wide scale.

Pigment-quality anatase titanium oxide is produced commercially by processes wherein titaniferrous ores, such as ilmenite, rutile, brookite or titaniferous iron ores, are dissolved through attack by relatively strong mineral acids, such as sulfuric or hydrofluoric acids. These acid solutions of titanium sulfate or fluoride, after purification and adjustment to suitable concentration, yield on hydrolysis an anatase titanium oxide precipitate. This precipitate is relatively insoluble in such monobasic acids as hydrogen chloride or other halogen acids. Accordingly, these anatase-producing processes have been considered as non-useful in the production of rutile crystalline TiO₂ pigments, especially in view of the fact that processes previously commercially available therefor have been limited to the dissolution of anhydrous titanium chloride in water, following which hydrolysis of the resultant solution is had. Therefore, the provision of a commercially useful process affording rutile titanium pigment production through hydrolysis of monobasic acid solutions and without necessity of resort to difficult and uneconomical chlorination operations is highly desirable.

It is among the objects of our invention, therefore, to provide a novel type of process for the production of rutile titanium oxide pigments, and particularly to effect such production from mineral acid solutions of titanium normally employed for producing anatase titanium oxide pigments. A further and particular object includes the provision of a process whereby prcipitated titanium oxide in substantially rutile crystalline form is obtained from orthotitanic acid. Further objects and advantages of the invention will be apparent from the ensuing description.

These and other objects are accomplished in the present invention, which broadly comprises precipitating orthotitanic acid from mineral acid solutions of titanium commonly employed in the production of anatase titanium oxide, dissolving the resultant orthotitanic acid in nitric acid or the titanium salt thereof, and then hydrolyzing the resultant monobasic acid titanium solution to obtain a rutile titanium oxide precipitate.

In a more specific embodiment, the invention comprises precipitating orthotitanic acid from titanium solutions of mineral acids from the group consisting of sulfuric and hydrofluoric acids, by treating said solutions with an alkali agent, dissolving said orthotitanic acid in nitric acid or titanium nitrate while maintaining not less than about 4 mols of the acid per mol of titanium, and then hydrolyzing the acid-titanium solution obtained to produce a rutile titanium oxide precipitate.

In a preferred and more specific embodiment, the invention comprises precipitating orthotitanic acid from a titanium fluoride solution by adding a sufficient quantity of alkali hydroxide thereto, washing the resultant orthotitanic acid precipitate to remove soluble salts therefrom, dissolving the purified precipitate in nitric acid or titanium nitrate, utilizing not less than a ratio of 4 mols of acid per mol of titanium in the precipitate in effecting such dissolving, and then hydrolyzing the resultant solution to precipitate rutile titanium oxide.

In one adaptation of the invention, a mineral acid solution of titanium, such as titanium sulfate or fluoride, which on hydrolysis is adapted to yield precipitated anatase titanium oxide, is prepared by dissolving a titaniferous ore, such as ilmenite or those mentioned or any artificially prepared titanium-bearing material or concentrate, in relatively strong sulfuric or hydrofluoric acid, preferably the latter, since fluoride solutions as a source of orthotitanic acid are preferred, due to the fact that an iron-free precipitate is thereby more readily obtained. The resultant attack mass is dissolved in water or dilute acid and a relatively concentrated titanium sulfate solution obtained. In instances where titanium sulfate solutions are utilized, reduction of said solution is effected whereby all of its iron content is converted to the ferrous condition. Where titanium fluoride solutions are utilized, their pH value is carefully adjusted to approximately 6.6, any iron present therein being removed by treatment with a soluble sulfide. A sufficient quantity of an alkali agent, preferably ammonium or sodium hydroxide, is then added to the titanium solution, the amounts of agent so employed being adequate to adjust the pH value of said solution to substantial neutralization, whereby precipitation of its titanium content as orthotitanic acid or hydrated titanium oxide is induced. The precipitate thus obtained is washed free of ferrous solution or any other soluble salts introduced as a result of alkali treatment and after purification is dissolved in cold nitric acid or titanium nitrate. Preferably, the nitric acid of the dissolving solutions is not less than about 50% $HNO_3$, in order to avoid unnecessary dilution upon addition of the hydrated titanium oxide cake. Similarly, a ratio of acid to titanium of not less than 4 mols of acid, and preferably from about 6 to 8 mols or higher, per mol of titanium is utilized. The resultant solution is then hydrolyzed in accordance with procedures such as outlined in the disclosures of U. S. Patents 2,062,133 or 2,062,134. The hydrolysis precipitate comprises substantially rutile titanium oxide. This is separated from the hydrolysis liquor, washed out in the customary manner, and then subjected to calcination, preferably in a rotary type of calciner. Temperatures ranging from above about 800° C. and to about 1100° C. are employed during said calcination. Preferably, however, temperatures ranging from above 900° C. and to about 1050° C. are utilized. The calcined titanium oxide is then wet or dry milled in accordance with conventional methods. The finished pigment comprises relatively small, uniform particle size rutile titanium oxide, of excellent pigmentary characteristics, particularly in respect to hiding power, color, tinting strength and oil absorption values.

In order that the invention may be more clearly understood, the following specific and illustrative examples are given, none of which is to be considered as in limitation of the invention:

Example I

A solution of titanium sulfate obtained by dissolving ilmenite in strong sulfuric acid, and containing 40 grams of $TiO_2$ per liter was added to a tank containing dilute ammonium hydroxide solution until a pH of 7.0 was reached. The resulting mixture comprised a suspension of orthotitanic acid (or titanium hydroxide) in ammonium sulfate. The solution was then removed by filtration and washing and sent to an ammonia recovery system wherein the ammonia was distilled out by boiling after treatment with lime. The gaseous ammonia was adsorbed in water and thus made ready for reuse in the precipitation of more titanium hydrate. The resultant orthotitanic acid filter cake was then continuously added to a titanium nitrate solution while maintaining within this solution a molar ratio of titanium to nitric acid of 1 to 5 by simultaneously adding recovered acid having a strength of 42%. In this manner, a titanium nitrate solution analyzing 62 grams $TiO_2$ per liter was produced. This solution was placed in an agitated batch hydrolysis tank equipped with an acid-resisting steam coil and upon heating to boiling and being so maintained for one hour, a yield of 95% rutile titanium oxide was obtained. The pigment was then separated from its acid mother liquor and calcined to develop desired and proper pigment properties. The acid was evaporated to 42% strength before recycling to the titanium dissolving step so as to maintain desired acid strength of solution during the subsequent cycle. Upon analysis of the pigment after calcination, it was found to consist of substantially 100% high quality rutile, superior in hiding power to the best titanium oxide pigment now on the market.

Example II

A solution of titanium fluoride was prepared by the action of hydrofluoric acid on ground rutile ore. The solution was adjusted to a pH value of about 6.6 with ammonium hydroxide and the iron precipitated as sulfide by addition of a solution of ammonium sulfide. The solution was then filtered to remove all solids and upon analysis was found to contain the equivalent of 50 grams $TiO_2$ per liter. The titanium oxide content thereof was then precipitated by addition of more ammonia and the resulting orthotitanic acid was freed of its mother liquor by filtration and washing. The filter cake and 40% nitric acid solution were continuously added to a dissolving tank while maintaining a temperature under 20° C. and about 6 mols of $HNO_3$ per mol of $TiO_2$. A substantially clear solution of titanium nitrate was thereby obtained. The solution was then withdrawn to agitated batch hydrolysis tanks, where it was heated to boiling by means of submerged steam coils. Upon analysis of the acid liquor at the end of 1 hour of boiling, a yield of approximately 97% $TiO_2$ was found to exist. The precipitate was removed by filtration, washed and subsequently calcined. X-ray examination and pigment tests disclosed it to consist of a high grade, 100% rutile pigment having 15% and 25% better hiding power and tinting strength values, respectively, than the best currently marketed titanium oxide pigment.

Example III

A solution of titanium sulfate obtained from the dissolution of ilmenite in strong sulfuric acid and containing 30 grams of $TiO_2$ per liter was added to a tank containing dilute ammonium hydroxide solution until a pH of 7.0 was reached. The resultant mixture comprised a suspension of orthotitanic acid in ammonium sulfate. The solution was then removed by filtration and sent to an ammonia recovery system, wherein the ammonia was distilled out by boiling after treatment with lime. The gaseous ammonia was adsorbed in water and thus made ready for reuse in the precipitation of more titanium hydrate. The orthotitanic acid cake was continuously added to a 40% nitric acid solution maintained at a temperature under about 20° C., the molar ratio of titanium to acid within such solution being about 1 to 8. The resultant solution containing about 50 grams $TiO_2$ per liter was placed in an agitated batch hydrolysis tank equipped with an acid-resistant steam coil heated to boiling and there maintained for an hour, a yield in excess of 95% $TiO_2$ being found to exist in the acid liquor on analysis. The precipitate was then separated from the acid mother liquor, subjected to washing and calcined to develop its pigment properties. The resultant product was found to consist of a high-quality rutile titanium oxide, superior in hiding power and tinting strength to commercially available titanium oxide pigments.

It will be found that the conditions under which the orthotitanic acid is precipitated, filtered, washed and employed are material and critical to the procurance of optimum benefits under the invention. Thus, precipitation is desirably effected at a temperature not in excess of about 30° C., and preferably not higher than about 20° C. Temperatures of the order of about 15° C. are usually resorted to, these temperatures being also maintained throughout substantially the subsequent filtering and washing steps. The washed cake will be found to contain relatively large amounts of water and, as a consequence, the solution which is prepared by the addition of the monobasic acid will be somewhat dilute in character. Concentrations in excess of 50 or 60 grams of $TiO_2$ per liter are therefore preferably resorted to, concentrations in excess of such lower 50 g./l. figure being usually required at all times. Similarly, the amount of nitric acid or titanium nitrate employed in such solution preparation is also important and critical to the obtainment of optimum benefits. As indicated, not less than about 4 mols of acid, and preferably not less than about 6 mols and up to about 8 mols or higher, per mol of titanium should be employed in effecting dissolving. Should the acid content run below the indicated lower limit, or should the $TiO_2$ content of the solution run below substantially 50 grams per liter, the quality of the resultant pigment product will be found to become undesirably affected. Further, as the ratio of acid to titanium decreases, it will be found that the amount of rutile present in the finished pigment will correspondingly decrease. Therefore, to insure the production of a high quality, 100% rutile $TiO_2$ precipitate, acid concentrations of from 6 to 8 mols of acid per mol of titanium will be found necessary. In the preferred adaptation of the invention, therefore, and to overcome the tendency of the precipitate to contain substantial and undesired amounts of anatase and avoid the possibility of the pigment product becoming poorer in hiding power, tinting strength, or color, or diminished in respect to other desired pigment values, resort to such higher ratios of acid to $TiO_2$ is accordingly recommended. Although the ratio of acid to titanium may, if desired, exceed the indicated upper ratio of 8 mols of acid to 1 of titanium, resort to ratios in excess thereof induces no additive or beneficial effects in the invention. Therefore, since the upper limit indicated insures the production of a 100% rutile titanium oxide precipitate, and higher ratios would merely prove uneconomical, resort to ratios in excess of the indicated limit is therefore unnecessary. As a further precaution against the production of a hydrolysis product containing substantial amounts of anatase and to insure the production of one consisting substantially completely of rutile, the titanium solution, when prepared from orthotitanic acid, should be not less than 3 normal and preferably not less than 4 normal in the acid, and in addition, be substantially free of polybasic acids.

The above examples disclose operations in which titanium solutions are prepared from orthotitanic acid and subsequently hydrolyzed to produce products which, upon calcination, exhibit pigment properties equal to or superior over the products from normal anatase-producing operations. As indicated, the precipitated titanium compound, if desired, may be added as a filter cake to a titanium solution such as titanium nitrate, rather than to strongly acid solutions, and this may be readily had by effecting such step in a relatively continuous manner. This comprises a particularly advantageous and desirable method of adapting the invention, since by so operating the resulting solutions appear freer of associated or colloidal titanium material, which, if present in appreciable quantities, undesirably interferes with the production of a rutile precipitate during thermal hydrolysis. The conditions of continuous dissolving may be approached by semi-continuous dissolution, and such mode of operation is accordingly considered as within the scope of the invention. In any dissolving procedure not strictly continuous, and wherein the orthotitanic acid cake and the acid are not added in a substantially simultaneous manner, it will be found desirable and advantageous to effect dissolution in such manner that not less than about 90% of the cake is dissolved in the titanium solution in which the dissolving solution contains not less than 5 grams of $TiO_2$ per liter.

Although specific alkali agents, such as ammonium and sodium hydroxide have been mentioned herein as utilizable in the invention for precipitating orthotitanic acid from titanium sulfate or fluoride solutions, the use of alkalies generally is contemplated for the purpose. Thus, the hydroxides and carbonates of ammonia, as well as those of the monovalent alkali metals, lithium, sodium, potassium, rubidium or cesium, may also be employed. For convenience, we generically designate these alkali compounds, here and in the appended claims, as "alkaline reagents." Obviously, any desired amount of alkaline reagent and sufficient to effect precipitation of the orthotitanic acid may be utilized in the invention; and in employing such reagent, the titanium solution being added to a solution of the same, or vice versa, as desired. Generally, precipitation of the orthotitanic acid is effected when neutralization is reached. Therefore, and as indicated, employment of an amount of alkali sufficient to induce neutralization ordinarily suffices. For most practical purposes, titanium precipitation will be found to occur within a pH range of from 4 to about 9, a convenient and preferred operative range, however, consisting of from 7 to 9 pH.

In the above disclosure, we have specified that the washing and filtration conditions are critical. The orthotitanic acid must be purified or washed until it is substantially free of salts of the acid which was used in the preparation of the solution from the ore. Anatase rather than rutile is produced if this requirement is not met and the objects of this invention are not had in that event.

It will be understood that by the term "orthotitanic acid," as here used and in the appended claims, we refer to that relatively gelatinous type of precipitate which is obtained upon addition of an alkaline reagent to a tetravalent titanium salt solution.

We claim as our invention:

1. A process for the preparation of rutile titanium oxide pigments from mineral acid solutions obtained from titanium-bearing materials and which solutions on hydrolysis normally produce anatase titanium oxide, comprising precipitating orthotitanic acid from said solutions by mixing an alkaline reagent therewith, dissolving the resultant precipitate while substantially free of a polybasic acid in a solution of an inorganic compound from the group consisting of nitric acid and a titanium salt thereof, hydrolyzing the resultant solution while substantially free from a polybasic acid to obtain a precipitate comprising rutile titanium oxide, and then calcining said precipitate to develop its pigment properties.

2. A process for the preparation of rutile titanium oxide pigments from mineral acid solutions obtained from titanium-bearing materials and which solutions normally produce anatase titanium oxide on hydrolysis, comprising precipitating orthotitanic acid from said solutions by mixing an alkaline reagent therewith, dissolving the resultant precipitated titanium compound while substantially free of a polybasic acid in nitric acid, hydrolyzing the resultant solution while substantially free from a polybasic acid to obtain a precipitate comprising rutile titanium oxide, and then calcining said precipitate to develop its pigment properties.

3. A process for the preparation of rutile titanium oxide pigments from titanium sulfate solutions obtained from sulfuric acid dissolution of titaniferous ores, comprising precipitating orthotitanic acid from said solutions by mixing the same with an alkaline reagent, subjecting the precipitated titanium compound to purification to remove any polybasic acids present therein, dissolving the resultant purified titanium compound in nitric acid, subjecting the resultant monobasic acid solution while substantially free from a polybasic acid to hydrolysis, and then calcining the precipitate comprising rutile titanium oxide.

4. A process for the preparation of rutile titanium oxide pigments from titanium sulfate solutions obtained from sulfuric acid dissolution of titaniferous ores, comprising precipitating orthotitanic acid from said solutions by mixing the same with an alkaline reagent, subjecting the precipitated titanium compound to purification to remove any polybasic acids present therein, dissolving the resultant purified titanium compound in titanium nitrate, subjecting the resultant monobasic acid solution while substantially free from a polybasic acid to hydrolysis, and then calcining the precipitate comprising rutile titanium oxide.

5. A process for the preparation of rutile titanium oxide pigments from titanium fluoride solutions obtained from titaniferous ore dissolution, comprising precipitating orthotitanic acid from said solutions by mixing the same with an alkaline reagent, subjecting the precipitated titanium compound to purification to remove any polybasic acids present therein, dissolving the resultant purified titanium compound in nitric acid, hydrolyzing the resultant monobasic acid solution while substantially free from a polybasic acid, and then calcining the precipitate comprising rutile titanium oxide.

6. A process for the preparation of rutile titanium oxide pigments from titanium fluoride solutions obtained from titaniferous ore dissolution, comprising precipitating orthotitanic acid from said solutions by mixing the same with an alkaline reagent, subjecting the precipitated titanium compound to purification to remove any polybasic acids present therein, dissolving the resultant purified titanium compound in nitric acid, hydrolyzing the resultant monobasic acid solution while substantially free from a polybasic acid, and then calcining the precipitate comprising rutile titanium oxide.

7. A process for producing rutile titanium oxide pigments from mineral acid solutions of titanium normally employed in the production of anatase titanium oxide, comprising mixing said solutions with an inorganic alkali compound to precipitate therefrom orthotitanic acid, dissolving the resultant precipitate while substantially free of polybasic acids in an inorganic compound from the group consisting of nitric acid and titanium nitrate, during such dissolution maintaining a ratio of at least 4 mols of acid to each mol of titanium, hydrolyzing the resultant monobasic acid solution while substantially free from a polybasic acid to obtain a substantially rutile titanium oxide precipitate, and then calcining said precipitate to develop its pigment properties.

8. A process for the production of rutile titanium oxide pigments from mineral acid solutions of titanium which on hydrolysis normally produce anatase titanium oxide, comprising precipitating orthotitanic acid from said solutions by mixing the same with an inorganic alkali compound, subjecting said orthotitanic acid precipitate to purification to remove any polybasic acid constituents present therein, dissolving the purified precipitate in an inorganic compound from the group consisting of nitric acid and titanium nitrate, maintaining a ratio of from 6 to 8 mols of acid per mol of titanium during such dissolution, hydrolyzing the resultant monobasic acid solution while substantially free from a polybasic acid to precipitate rutile titanium oxide, and then calcining said precipitate to develop its pigment properties.

9. A process for producing rutile titanium oxide pigments from titanium sulfate solutions, comprising mixing said solutions with an alkali hydroxide to precipitate therefrom orthotitanic acid, dissolving the resultant precipitate while substantially free of polybasic acid constituents in an inorganic compound from the group consisting of nitric acid and titanium nitrate, during such dissolution maintaining an acid concentration of at least 4 mols of acid agent to each mol of titanium, hydrolyzing the resultant solution while substantially free from a polybasic acid to obtain a substantially rutile titanium oxide precipitate, and then subjecting said precipitate to calcination to develop its pigment properties.

10. A process for producing rutile titanium oxide pigments from titanium fluoride solutions, comprising mixing said solutions with an alkali hydroxide to precipitate therefrom orthotitanic acid, dissolving the resultant precipitate while substantially free of polybasic acid constituents in an inorganic compound from the group consisting of nitric acid and titanium nitrate, during such dissolution maintaining an acid concentration of at least 4 mols of acid agent to 1 mol of titanium, hydrolyzing the resultant solution while substantially free from a polybasic acid to obtain a substantially rutile titanium oxide precipitate, and then subjecting said precipitate to calcination to develop its pigment properties.

11. A process for producing rutile titanium oxide pigments from titanium sulfate solutions, comprising precipitating orthotitanic acid from said solutions by mixing the same with alkali hydroxide, subjecting said orthotitanic acid precipitate to purification to remove polybasic acid constituents present therein, dissolving the purified precipitate in nitric acid while maintaining a ratio of from 6 to 8 mols of acid per mol of titanium, hydrolyzing the resultant acid solution while substantially free from a polybasic acid to precipitate rutile titanium oxide, and then calcining said rutile titanium oxide precipitate to develop its pigment properties.

12. A process for the production of rutile titanium oxide pigments from titanium fluoride solutions, comprising precipitating orthotitanic acid from said solutions by mixing the same with alkali hydroxide, subjecting said orthotitanic acid precipitate to purification to remove polybasic acid constituents present therein, dissolving the purified precipitate in nitric acid while maintaining a ratio of from 6 to 8 mols of acid per mol of titanium, hydrolyzing the resultant acid solution while substantially free from a polybasic acid to precipitate rutile titanium oxide, and then calcining said rutile titanium oxide precipitate to develop its pigment properties.

13. A process for producing rutile titanium oxide pigments from mineral acid solutions obtained from titanium-bearing minerals which solutions normally produce anatase titanium oxide on hydrolysis, comprising precipitating orthotitanic acid from said solutions by mixing an inorganic alkali compound therewith, during said precipitation maintaining said solution at a temperature not in excess of substantially 30° C.; purifying the resulting orthotitanic acid precipitate to remove any polybasic acid constituents present therein, dissolving the purified precipitate in an inorganic compound from the group consisting of nitric acid and a titanium salt thereof, maintaining a ratio of acid to titanium in said dissolving solution of not less than 4 mols of acid for each mol of titanium, hydrolyzing the resultant solution while substantially free from a polybasic acid to precipitate rutile titanium oxide, and then calcining said rutile precipitate to develop its pigment properties.

ROBERT M. McKINNEY.
HENRY M. STARK.